US011516215B2

(12) United States Patent
Hamouda et al.

(10) Patent No.: US 11,516,215 B2
(45) Date of Patent: Nov. 29, 2022

(54) SECURE ACCESS TO ENCRYPTED DATA OF A USER TERMINAL (71) Applicant: IDEMIA France, Courbevoie (FR)

(72) Inventors: Mourad Hamouda, Courbevoie (FR); Jérôme Dumoulin, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 242 days.

(21) Appl. No.: 16/705,663

(22) Filed: Dec. 6, 2019

(65) Prior Publication Data

US 2020/0195638 A1    Jun. 18, 2020

(30) Foreign Application Priority Data

Dec. 12, 2018  (FR) ..................................... 1872779

(51) Int. Cl.
*H04L 9/40* (2022.01)
*G06F 21/60* (2013.01)
*G06F 21/44* (2013.01)

(52) U.S. Cl.
CPC ........ *H04L 63/0869* (2013.01); *G06F 21/445* (2013.01); *G06F 21/606* (2013.01);
(Continued)

(58) Field of Classification Search
CPC ............. H04L 63/0869; H04L 63/0853; H04L 63/0876; H04L 63/0435; H04L 63/0471; G06F 21/445; G06F 21/606
See application file for complete search history.

(56) References Cited

U.S. PATENT DOCUMENTS 6,212,097 B1 * 4/2001 Kihara ...................... G06F 3/08
                                                      365/185.04
6,616,535 B1 * 9/2003 Nishizaki ................ G07F 17/32
                                                      235/380
(Continued)

FOREIGN PATENT DOCUMENTS

CA       2 940 377        3/2018
WO    WO 2015/042548      3/2015

OTHER PUBLICATIONS

"Technical Guideline TR-03110-1, Advanced Security Mechanisms for Machine Readable Travel Documents and eIDAS Token—Part 1—eMRTDs with BAC/PACEv2 and EACv1", Version 2.20. Feb. 26, 2015. 22 pgs. (Year: 2015).*

(Continued)

*Primary Examiner* — Zachary A. Davis
(74) *Attorney, Agent, or Firm* — Nixon & Vanderhye (57) ABSTRACT To allow access to encrypted data stored in the memory of a user terminal, the corresponding secret encryption key is stored in a secure element integrated into the user terminal and this secure element serves as a highly secure relay toward an access device to this data, used by a third party. To do so, a secure communication channel is established between the third party and the secure element. The EAC standard allows mutual authentication accompanied by the establishment of such a secure communication channel. The secure element performs an encryption conversion of the data so that the latter is protected by a session (or transport) key associated with the secure communication channel, and no longer by the initial secret key. The third party can thus access the encrypted data without even knowing the initial secret key.

16 Claims, 3 Drawing Sheets

(52) U.S. Cl.
CPC ...... *H04L 63/0435* (2013.01); *H04L 63/0853*
(2013.01); *H04L 63/0876* (2013.01)

(56) References Cited

U.S. PATENT DOCUMENTS

| | | | | |
|---|---|---|---|---|
| 6,971,020 B1* | 11/2005 | Liardet | ..................... | H04L 9/06 380/255 |
| 7,373,508 B1* | 5/2008 | Meier | ................. | H04W 12/065 713/168 |
| 7,380,125 B2* | 5/2008 | Di Luoffo | ............ | G06Q 20/355 380/278 |
| 7,630,940 B2* | 12/2009 | Watanabe | ............... | G06F 21/10 705/52 |
| 7,793,102 B2* | 9/2010 | Malville | ........... | H04W 12/0431 713/169 |
| 7,805,611 B1* | 9/2010 | Montemayor | ...... | H04L 63/0869 380/255 |
| 8,229,857 B2* | 7/2012 | Diehl | ............... | G11B 20/00188 705/51 |
| 8,872,721 B2* | 10/2014 | Tietke | .................. | G06K 7/0008 343/867 |
| 9,606,810 B2* | 3/2017 | Schmalz | ............... | G06F 9/4406 |
| 2008/0071690 A1* | 3/2008 | Lee | ......................... | G06F 21/10 705/59 |
| 2008/0148063 A1 | 6/2008 | Hanko et al. | | |
| 2008/0219451 A1* | 9/2008 | Ju | ........................... | G06F 21/10 380/282 |
| 2010/0131775 A1* | 5/2010 | Jogand-Coulomb | ....................... | G11B 20/00253 713/193 |
| 2014/0281489 A1 | 9/2014 | Peterka et al. | | |

OTHER PUBLICATIONS

"Technical Guideline TR-03110, Advanced Security Mechanisms for Machine Readable Travel Documents and eIDAS Token—Part 2: Protocols for electronic IDentification, Authentication and trust", Version 2.21. Dec. 21, 2016. 35 pgs. (Year: 2016).*
French Search Report, FR 1872779, dated Sep. 5, 2019.

* cited by examiner

SECURE ACCESS TO ENCRYPTED DATA OF A USER TERMINAL

TECHNICAL FIELD

The present invention relates to the context of secure access to data stored in computer systems.

BACKGROUND OF THE INVENTION

The protection of data stored in a user terminal, typically a mobile phone, and the encryption integrated into the embedded operating system constitute a powerful system for securing information.

Typically, the operating system is encrypted at factory using a master key specific to the manufacturer. The operating system then encrypts the data when used. Thus, all the files (sometimes on one part only of the phone memory) in the phone are encrypted using this master key, and often using an additional secret code, specific to the user and not known to the phone manufacturer.

For various reasons, for example judicial reasons, it is important that certain authorized third parties can access this encrypted data.

It is rare for the user to disclose his/her personal secret code, but testing several possible secret codes is not an effective solution because quickly (after a few attempts), the securing in the phone can lead to erasing all the stored data.

The disclosure, by the manufacturer, of the master key of the latter also poses some problems. For example, the third party who recovers this master key is able to access the encrypted data stored throughout the telephone base of the manufacturer.

There is therefore a need to improve this situation to allow access to encrypted data stored in the memory of a mobile terminal.

BRIEF SUMMARY OF THE INVENTION

It is in this context that the invention proposes a new method for accessing data stored in the memory of a user terminal. The stored data is encrypted using a secret key stored in a secure element integrated into the user terminal. The secure element performs mutual authentication with an access device, the mutual authentication establishing, between the secure element and the access device, a communication channel secured by a session key. Then, in response to a request for accessing the data stored in the user terminal, the secure element recovers, from the user terminal, the encrypted data, converts the encryption of the recovered data into an encryption by the session key, then transmits the re-encrypted data to the access device via the secure communication channel.

With respect to the access device, the invention also relates to a method for accessing data stored in the memory of a user terminal. The stored data is encrypted using a secret key stored in a secure element integrated into the user terminal. The access device performs mutual authentication with the secure element, the mutual authentication establishing, between the secure element and the access device, a communication channel secured by a session key. Then the access device sends, to the secure element, a request for accessing the data stored in the user terminal, and, in response, receives, from the secure element via the secure communication channel, the data that is not encrypted by the secret key and encrypted by the session key.

The memory storing the encrypted data means a memory fitted to the user terminal, excluding the secure element. The latter is non-removable, preferably welded to the user terminal in order to guarantee, over time, a pairing therebetween.

The present invention allows secure access to encrypted data stored in the memory of the terminal, without knowing the keys or secret codes that protect them. This is made possible by the use of a secure element performing an encryption conversion. The secure element thus operates as an entry door to the encrypted memory of the user terminal.

Correlatively, the invention relates to a user terminal integrating a secure element and comprising a memory storing data encrypted using a secret key stored in the secure element. The secure element comprises a microprocessor configured to carry out the steps defined above. The invention also relates to a device for accessing a user terminal integrating a secure element and comprising a memory storing data encrypted using a secret key stored in the secure element. The access device comprises a microprocessor configured to carry out the steps defined above.

Optional characteristics of embodiments of the invention are defined in the dependent claims.

In one embodiment, converting the encryption of the recovered data comprises decrypting, using the secret key stored in the secure element, the recovered data and encrypting, using the session key, the decrypted data before transmitting the re-encrypted data to the access device via the secure communication channel. It is therefore a re-encryption of the data. In this way, there is no need to disclose to the outside, and in particular to the access device, the secret key or any other user secret code.

In another embodiment, the mutual authentication complies with the Extended Access Control, EAC, European standard. It is a standard based on a public key infrastructure (PKI) and certificates. This standard is in particular defined by a dedicated documentation, including technical guidelines TR-03110. Advanced Security Mechanisms for Machine Readable Travel Documents—Extended Access Control (EAC) (in version 2). In particular, reference is made below to Part 1 in its 2.20 version.

In one embodiment, the access device is external to the user terminal.

Alternatively, the access device forms a sub-part of the user terminal. In this case, this sub-part of the terminal and the secure element perform mutual authentication, allowing this sub-part (for example a possibly removable memory controller, a screen controller, etc.) to obtain the re-encrypted data in order to allow their use (for example, a copy on a removable card provided in the terminal or a display on a screen of the data once decrypted).

In yet another embodiment, the secret key is obtained by diversification of a master key using a unique identifier of the user terminal, for example the IMEI (International Mobile Equipment Identity), which individualizes encryption at each pair formed of a terminal and an integrated secure element.

According to an additional characteristic, decrypting is further based on a user secret code, typically a PIN code.

In one embodiment, the memory (it can be part of all the memory, for example a partition) of the user terminal is encrypted by the secret key, which reflects a global type of securization of the memory of the user terminals.

In one embodiment relating to the access device, the method can further comprise decrypting the received data, using the session key. In addition, the method can then comprise the display, on the access device, of the thus decrypted data.

The invention also relates to a computer program product comprising instructions configured to implement the steps of one of the methods above when said program is run on a computer, as well as to a tangible medium comprising such a computer program product.

BRIEF DESCRIPTION OF THE DRAWINGS

Other features and advantages of the invention will become apparent in the description below, illustrated by the attached figures which illustrate exemplary embodiments thereof devoid of any limiting character.

DETAILED DESCRIPTION

To allow the access to encrypted data stored in the memory of a user terminal, the corresponding secret encryption key is stored in a secure element integrated into the user terminal and this secure element serves as a highly secure relay toward an access device to this data, used by a third party. To do so, a secure communication channel is established between the third party and the secure element. The secure element performs an encryption conversion of the data so that the latter is protected by a session (or transport) key associated with the secure communication channel, and no longer by the initial secret key. The third party can thus access the encrypted data without even knowing the initial secret key.

Figure 1:
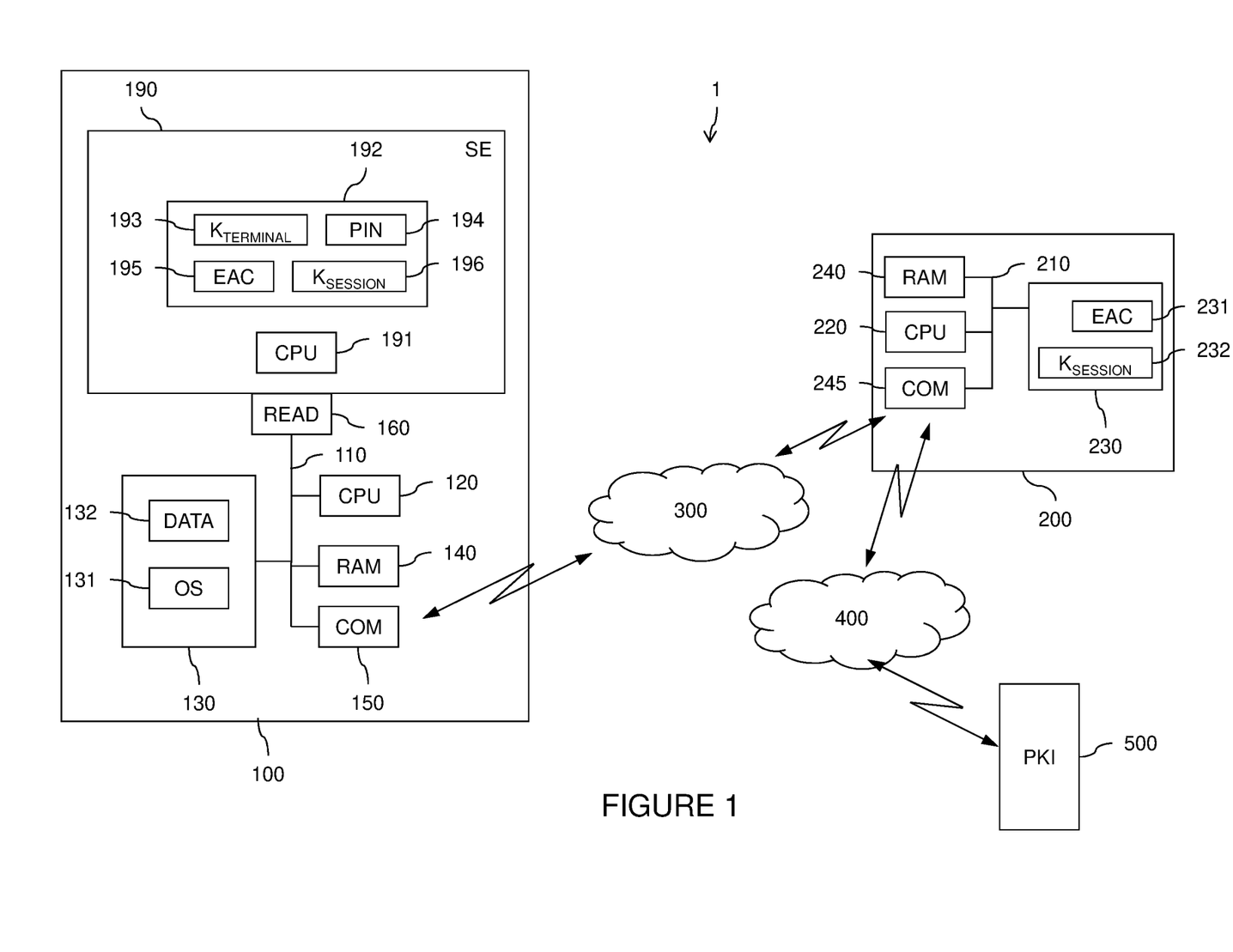
FIG. 1 schematically illustrates a system for an implementation of the invention.

FIG. 1 schematically illustrates a system 1 for an implementation of the invention, in which a user terminal 100 is connected to an access device 200 through a connection 300. The access device 200 is further connected, via a network 400 which may be similar to 300, to equipment 500 of a public key infrastructure PKI. Although a single user terminal 100 is represented, the invention also applies to a fleet of user terminals, each being accessed separately as disclosed below.

The user terminal 100 can comprise or be implemented by a phone (for example, a cellular phone or a smart phone), a computer (for example, a portable computer), a tablet, a portable communication device, a portable computing device (for example, personal data assistant), an entertainment device (for example, a music or video device, or a satellite radio), a global positioning system (GPS), or any other suitable device that is configured to communicate via a wireless or wired connection medium 300 with the access device 200.

The user terminal 100 includes a communication bus 110 to which are connected:
- a processing unit 120—or microprocessor—denoted CPU (Central Processing Unit);
- one or more non-volatile memories 130, for example ROM (Read Only Memory), Flash, EEPROM (Electrically Erasable Programmable Read Only Memory) or any type of hard disk;
- a random access memory RAM 140 or cache memory or volatile memory comprising registers adapted to record variables and parameters during the operation of the terminal; during the implementation of the invention, the program instruction codes stored in the non-volatile read only memory are loaded into RAM memory in order to be executed by the processing unit CPU;
- one or more communication interfaces 150 adapted to transmit and receive data via connections (300), for example via a telecommunications network;
- a conventional I/O (Input/Output) interface for a user terminal. This interface is not represented and may comprise, for example, a screen, a keyboard, a mouse or another pointing device such as a touch screen or a remote control; and
- a secure element reader 160.

The communication bus allows communication and interoperability between the different elements included in the equipment or connected thereto. The representation of the bus is not limitative and, in particular, the processing unit is likely to communicate instructions to any element of the equipment directly or through another element of this equipment.

The user terminal 100 also includes a secure element 190 connected to the reader 160. Preferably, the secure element 190 is fixed in a non-removable manner to the user terminal 100.

A secure element, SE, is a tamper-resistant component or hardware platform (typically a chip or a smart card) used in the terminal called "host" terminal and capable of securely hosting applications and data in compliance with security rules and requirements set by trusted authorities. It includes a specific microprocessor 191 as well as one or more memories 192 that may comprise a computer program comprising instructions for the implementation of a method according to different embodiments of the invention. The instruction codes of the program are loaded into RAM memory (not represented) of the secure element in order to be executed by the microprocessor 191.

An increasingly used form factor of the SE is the embedded Secure Element, eSE. This embedded secure element is welded to the host terminal 100 during the manufacture of the latter.

The secure element 190 communicates with the host terminal 100 (via the reader 160) using Application Protocol Data Unit (APDU)-type commands, compliant for example with the ISO/IEC 7816 standard, possibly encapsulated in frames managed by APIs (application programming interface) interfacing the secure element 190 to the user terminal 100. Other protocols than ISO/IEC 7816 can be used, for example SWP (Single Wire Protocol), HCI (Host Controller Interface), SPI (Serial Peripheral Interface), I²C (Inter-Integrated Circuit).

An operating system 131 of the terminal 100, and usage data 132, are stored in the memory 130 in encrypted form from factory. The encryption is performed according to conventional techniques, typically by using the AES algorithm (Advanced Encryption Standard) using a secret key $K_{TERMINAL}$ 193, and optionally by also using a secret code of the user 194 (PIN code, code derived from biometric data). The key $K_{TERMINAL}$ is securely stored in the secure element 190. Advantageously, the key $K_{TERMINAL}$ has been generated by diversification of a master key (specific to the manufacturer of the terminal) using a unique identifier of the user terminal (for example a serial number or the IMEI in the case of a phone). The manufacturer can thus individualize, at low cost, the key $K_{TERMINAL}$ in each user terminal of a fleet he/she has set up.

When the terminal 100 is used by a user, the latter can authenticate himself/herself on the terminal using a personal code, typically a PIN code, or any other authentication means, which causes the decryption of the operating system 131 and the data 132 for a normal operation. Any new data generated and stored in the memory 131 is automatically encrypted by the AES algorithm using the key $K_{TERMINAL}$ 193.

The access device 200 can be any type of equipment configured to communicate via a wireless or wired connection medium 300 with the user terminal 100. The wireless or wired medium 300 can be any type of telecommunications network (Wifi, WLAN, Internet, mobile such as 2G, 3G, 4G, 5G) or any type of local communication means, such as Infrared, NFC (Near Field Communication), Bluetooth, USB, etc.

Conventionally and similarly to the terminal 100, the access device 200 includes a communication bus 210 to which are connected a processing unit 220, one or more non-volatile memories 230, a random access memory 240, one or more communication interfaces 245 in order to communicate via the connection 300 and/or the network 400, and an I/O input/output interface (not represented). All or part of the memories can be implemented using a secure element, in particular for storing secret data, such as cryptographic keys, certificates as discussed below.

In one embodiment, the access device 200 may be the terminal 100 which has a similar structure. In this case, a sub-part of the terminal 100 (sub-part not including the encrypted memory 130) operates as an access device, and the connection 300 can be any type of communication bus or means internal to the terminal 100. For example, an application managing a peripheral (a memory, an SD card, a screen for example) may be caused to establish a connection with the secure element to recover, according to the teachings of the invention, the data initially encrypted using the key $K_{TERMINAL}$ 193. The remainder of the description mentions an "access device 200" which can therefore be implemented within the terminal 100.

The memories 230 comprise a computer program comprising instructions for the implementation of a method according to different embodiments of the invention. The program instruction codes are loaded into RAM memory 240 in order to be executed by the microprocessor 220.

A mutual authentication module 231 in compliance with the Extended Access Control, EAC, standard is stored in the memory 230. As described below, it makes it possible to perform mutual authentication with the secure element 190, by establishing, between the secure element 190 and the access device 200 (via the communication 300), a communication channel secured by a session key. Symmetrically, a corresponding EAC module 195 is stored in the memory 192 of the secure element 190.

The EAC standard, defined by the ICAO (International Civil Aviation Organization), is conventionally used in the context of electronic passports. It guarantees that sensitive data is accessible, via a secure channel, only by an authorized third party. It is based on a public key infrastructure, PKI, 500 to which the access device 200 can access via a communication network 400 (such as WLAN, Internet, mobile network, etc.). It is defined in technical guidelines "TR-03110—Advanced Security Mechanisms for Machine Readable Travel Documents—Extended Access Control (EAC)" (parts 1 to 4).

As described in part 1 (in its 2.20 version), the mutual authentication EAC includes Chip Authentication and Terminal Authentication.

The authentication protocol of the chip, here of the secure element 190, is an ephemeral and static agreement protocol by exchange of Diffie-Hellman keys which ensures a secure communication and the unilateral authentication of the secure element 190 by the terminal (here the access device 200). The chip and the terminal compute a common secret from which they derive session keys, noted here $K_{SESSION}$ 196/232, to protect the secure communication therebetween. In practice, the chip sends, to the terminal, its static Diffie-Hellman public key and domain parameters. The terminal generates a pair of ephemeral Diffie-Hellman keys and sends the generated ephemeral public key to the chip. The chip and the terminal then compute the shared secret, the session keys derived from the common secret, and the compressed ephemeral public key of the terminal for the authentication of the latter.

The terminal authentication protocol to authenticate a terminal, here the access device 200, is a challenge-response protocol which provides explicit unilateral authentication of the terminal. It allows the chip (here the secure element 190) to verify that the terminal is authorized to access the sensitive data of the electronic passport. In practice, the terminal sends a certificate chain (issued by a trusted and independent third party authority) to the chip, the chain starting with a certificate verifiable with a public key of the third party authority, stored on the chip, and ends with the terminal certificate. The chip verifies the certificates and extracts therefrom the public key of the terminal. The chip randomly chooses a challenge and sends it to the terminal, which responds with a signature based on the challenge, its private key and the compressed ephemeral public key. The chip then verifies the signature using the public key of the terminal.

Figure 2A:
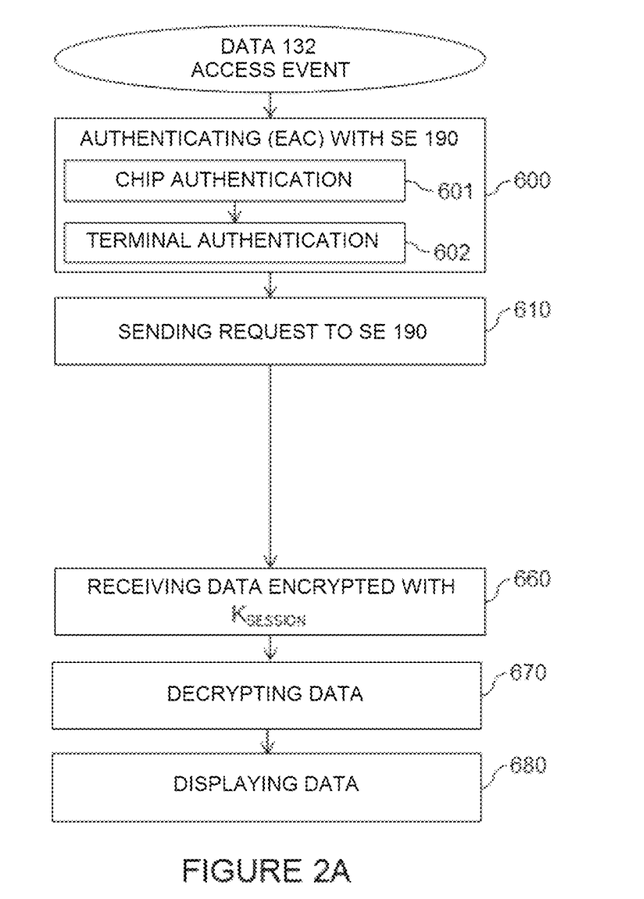
FIG. 2A illustrates, using a flowchart, steps of an implementation of the invention based on the use of the EAC standard, at the access device of FIG. 1.
Figure 2B:
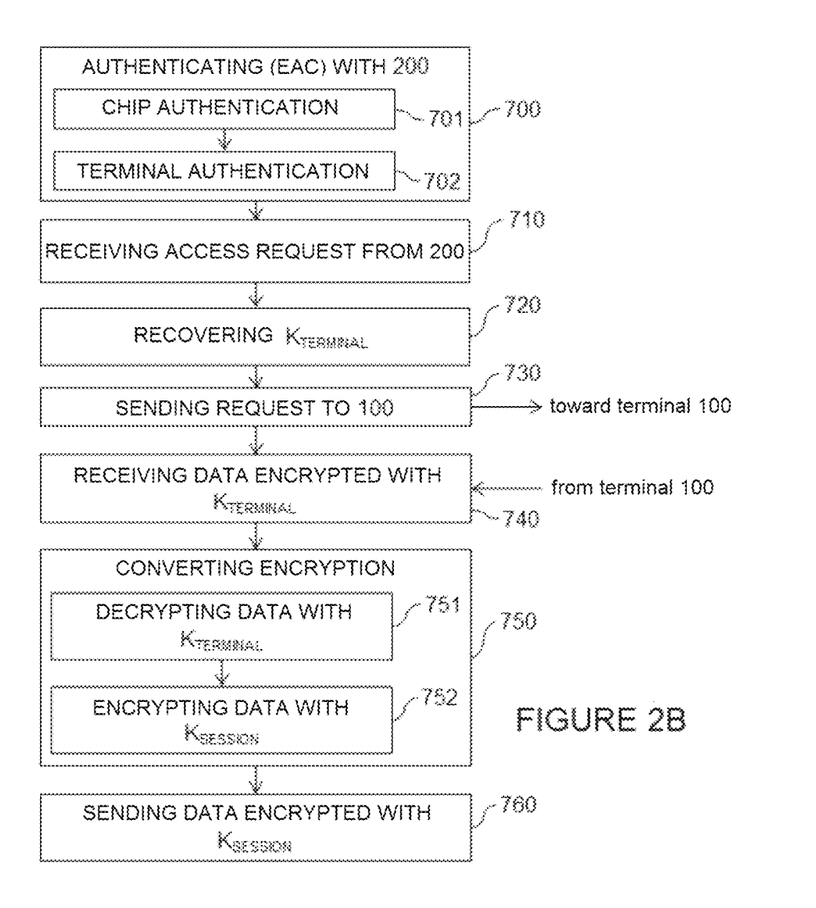
FIG. 2B illustrates, using a flowchart, steps of an implementation of the invention based on the use of the EAC standard, at the secure element of FIG. 1.

FIGS. 2A and 2B illustrate, using flowcharts, steps of an implementation of the invention based in particular on the use of the above-mentioned EAC standard. FIG. 2A illustrates operations on the side of the access device 200, while FIG. 2B illustrates operations on the side of the secure element 100. Of course, the invention also applies when other mutual authentication protocols establishing a secure session are used.

When these operations are implemented, the terminal 100 is in use. Its operating system 131 and its data 132 in the memory 130 are encrypted by the secret key $K_{TERMINAL}$ 193 and optionally by the user secret code 194. The operations of the Figures allow accessing these encrypted data stored in the memory of the user terminal, without knowing the secret key and the secret code used for encryption.

In steps 600 (on the access device 200 side) and 700 (on the secure element 190 side), the access device 200 and the secure element 190 perform mutual authentication with establishment of a communication channel (on the link 300) secured by a session key $K_{SESSION}$. These steps are initiated by the access device 200 when an operator triggers an action for accessing the memories of the terminal 100.

These steps are carried out by the EAC modules 231 and 195. They include a chip authentication step 601/701 to authenticate the secure element 190 and a terminal authentication step 602/702 to verify, using certificates, that the access device 200 is authorized by the third party authority to access the memories of the user terminal 100. The chip authentication step 601/701 allows the generation of session keys $K_{SESSION}$ 232/196 stored in the memory respectively of the access device 200 and of the secure element 190. These session keys secure a communication channel between the access device 200 and the secure element 190.

The user terminal 100 acts as a relay in the secure communication channel between the secure element 192 and the access device 200 external to the terminal 100 (since it holds the communication interfaces 150 with the outside) or as a relay between the secure element 192 and the access device 200 forming a sub-part of the terminal 100 (since it controls the communications buses or means internal thereto). However, having no access to the session keys, the user terminal 100 is unable to read and utilize the data that pass through the secure channel.

In the case of successful mutual authentication, a request for accessing encrypted data stored in the memory 130 of the user terminal 100 is sent by the access device 200 to the secure element 190 during step 610. This sending is carried out in the communication channel secured by the keys $K_{SESSION}$, meaning that the request is encrypted using these keys.

The request can be of the ADPU command type encapsulated in frames of other communication protocols.

The request can identify a particular data item to be recovered, in particular if the encrypted data are indexed in the memory of the user terminal 100.

Alternatively, the request can indicate all or part of the memory to be recovered. A part of memory can consist of indicating an address, a range of memory addresses (for example logical addresses), a page or a partition or one or more files (record or binary files, in the sense of file system).

For example, the request is an ISO/IEC 7816-part 4 "read binary", "read memory" command with the appropriate parameters (file, or memory address parameters).

In step 710, the secure element 190 receives the encrypted request, decrypts it using $K_{SESSION}$ 196 and launches its execution.

The latter comprises in step 720, the recovery of the secret encryption key $K_{TERMINAL}$ 193, and possibly on the user secret code 194 side, by the secure element 190 from its memory 192.

In parallel, before or after step 720, the secure element 190 sends, to the user terminal 100, a request for obtaining the data referred to in the request received in step 710. This is step 730. The request can be in the APDU command format and sent to the operating system of the terminal 100 via the reader 160.

This request is processed conventionally by the user terminal 100 which sends back the requested data.

In a first embodiment, the returned data is the encrypted data 132, in which case the decryption is performed by the secure element 192.

In a second alternative embodiment, the returned data is decrypted data. In this case, the operating system 131 of the phone can for example perform the decryption of the data 132 upon receipt of the request 730 from the SE 192 and send back the decrypted data. In this embodiment, the secure element makes its requests to an agent (application) located in the memory of the terminal 100 in charge of receiving the requests coming from the secure element 192 after a prior authentication phase between the secure element and the agent. The encryption key $K_{TERMINAL}$ 193 and the possible user code 194 can then be provided by the secure element to the terminal if necessary.

Thus, in response to the access request, the secure element 190 recovers, from the user terminal 100, the data, encrypted or not, according to the embodiment, via the reader 160. This is step 740.

This is followed by a step 750 where the secure element 190 having the encryption/decryption key $K_{TERMINAL}$ 193, the optional secret code 194 and the session key $K_{SESSION}$ 196 converts the encryption of the recovered data 132 into an encryption by the session key. This is a re-encryption of the data.

This step includes for example a decryption 751, using the secret key $K_{TERMINAL}$ 193 and the optional secret code 194, of the recovered data 132 (in the example using the AES algorithm) then an encryption 752, using the session key $K_{SESSION}$ 196, of the thus decrypted data. Step 751 is not carried out by the secure element in the second embodiment where it receives, from the terminal 100, the already decrypted data.

The secure element 190 can thus transmit the re-encrypted data to the access device 200 via the secure communication channel. This is step 760.

The access device 200 thus receives in step 660, from the secure element 190 via the secure communication channel, the data 132 unencrypted by the secret key $K_{TERMINAL}$) (and optionally by the user secret code 194) but encrypted by the session key $K_{SESSION}$.

This data recovered without knowing $K_{TERMINAL}$ 193 (and optionally the user secret code 194) can thus be utilized by the operator using the access device 200. For example, this recovered data can be decrypted using the key session $K_{SESSION}$ in step 670, then displayed on a display screen or saved in memory (for example removable memory) in step 680.

For example, in the second embodiment where the access device forms a sub-part of the terminal 100, the thus recovered and decrypted data can be displayed on the screen of the terminal or saved in a removable memory (such as memory card).

Thanks to these embodiments, the operator who doesn't know the secret key $K_{TERMINAL}$ (and optionally the user secret code 194) securely accesses, if authorized to do so, the encrypted data of a user terminal, without compromising the encrypted data of other terminals of the same fleet (of the same manufacturer).

The foregoing examples are only embodiments of the invention which is not limited thereto.

The invention claimed is:

1. A method for accessing data stored in a memory of a user terminal that integrates a secure element, the secure element being a chip or a smart card integrated in the user terminal, the secure element including a specific microprocessor and one or more memories, the user terminal and the secure element communicating with each other using a secure element reader, the method comprising:
   encrypting, by an operating system of the user terminal, data using a secret key stored in the secure element, the secret key being obtained by diversification of a master key using a unique identifier of the user terminal; and
   storing the encrypted data in the memory of the user terminal,
   the method further comprising, in the secure element:
   performing mutual authentication with an access device, the mutual authentication establishing, between the secure element and the access device, a communication channel secured by a session key; and
   in response to a request, received from the access device, to access the data that are stored in the user terminal and encrypted by the operating system of the user terminal using the secret key stored in the secure element:

recovering, from the user terminal, the stored encrypted data, converting the encryption of the recovered data into an encryption by the session key, and transmitting the re-encrypted data to the access device via the secure communication channel after recovering the stored encrypted data and converting the encryption of the recovered data.

2. The method according to claim 1, wherein converting the encryption of the recovered data comprises:

decrypting the recovered data using the secret key stored in the secure element; and encrypting the decrypted data using the session key, before transmitting the re-encrypted data to the access device via the secure communication channel.

3. The method according to claim 1, wherein the mutual authentication complies with the Extended Access Control European standard.

4. The method according to claim 1, wherein the access device is external to the user terminal.

5. The method according to claim 1, wherein the access device forms a sub-part of the user terminal.

6. The method according to claim 1, wherein converting the encryption of the recovered data comprises:

decrypting, using the secret key stored in the secure element and a user secret code, the recovered data; and encrypting, using the session key, the decrypted data before transmitting the re-encrypted data to the access device via the secure communication channel.

7. The method according to claim 1, wherein the memory of the user terminal is encrypted by the secret key.

8. A non-transitory computer-readable storage medium storing a program to cause a computer to execute a method for accessing data stored in a memory of a user terminal that integrates a secure element, the secure element being a chip or a smart card integrated in the user terminal, the secure element including a specific microprocessor and one or more memories, the user terminal and the secure element communicating with each other using a secure element reader, the method comprising:

encrypting, by an operating system of the user terminal, data using a secret key stored in the secure element, the secret key being obtained by diversification of a master key using a unique identifier of the user terminal; and storing the encrypted data in the memory of the user terminal, the method further comprising, in the secure element:

performing mutual authentication with an access device, the mutual authentication establishing, between the secure element and the access device, a communication channel secured by a session key, and in response to a request, received from the access device, to access the data that are stored in the user terminal and encrypted by the operating system of the user terminal using the secret key stored in the secure element:

recovering, from the user terminal, the stored encrypted data, converting the encryption of the recovered data into an encryption by the session key, and transmitting the re-encrypted data to the access device via the secure communication channel after recovering the stored encrypted data and converting the encryption of the recovered data.

9. A user terminal that integrates a secure element that is a chip or a smart card, the user terminal and the secure element communicating with each other using a secure element reader, the user terminal comprising:

one or more memories; and a specific microprocessor configured to:

encrypt, by an operating system of the user terminal, data using a secret key stored in the secure element, the secret key being obtained by diversification of a master key using a unique identifier of the user terminal, store the encrypted data in the memory of the user terminal, perform mutual authentication with an access device, the mutual authentication establishing, between the secure element and the access device, a communication channel secured by a session key, and in response to a request, received from the access device, to access the data that are stored in the user terminal and encrypted by the operating system of the user terminal using the secret key stored in the secure element:

recover, from the user terminal, the stored encrypted data, convert the encryption of the recovered data into an encryption by the session key, and transmit the re-encrypted data to the access device via the secure communication channel after recovering the stored encrypted data and converting the encryption of the recovered data.

10. A method for accessing data stored in a memory of a user terminal that integrates a secure element, the secure element being a chip or a smart card integrated in the user terminal, the secure element including a specific microprocessor and one or more memories, the user terminal and the secure element communicating with each other using a secure element reader, the method comprising:

encrypting, by an operating system of the user terminal, data using a secret key stored in the secure element, the secret key being obtained by diversification of a master key using a unique identifier of the user terminal; and storing the encrypted data in the memory of the user terminal, the method further comprising, in an access device:

performing mutual authentication with the secure element, the mutual authentication establishing, between the secure element and the access device, a communication channel secured by a session key;

sending, to the secure element, a request to access the data that are stored in the user terminal and encrypted by the operating system of the user terminal using the secret key stored in the secure element; and in response to the request, receiving, from the secure element via the secure communication channel, the data having been decrypted and then encrypted by the session key.

11. The method according to claim 10, wherein the mutual authentication complies with the Extended Access Control European standard.

12. The method according to claim 10, wherein the access device is external to the user terminal.

13. The method according to claim 10, wherein the access device forms a sub-part of the user terminal.

14. The method according to claim 10, further comprising decrypting the received data, using the session key.

15. A non-transitory computer-readable storage medium storing a program to cause a computer to execute a method for accessing data stored in a memory of a user terminal that integrates a secure element, the secure element being a chip or a smart card integrated in the user terminal, the secure element including a specific microprocessor and one or more memories, the user terminal and the secure element communicating with each other using a secure element reader, the data being encrypted, by an operating system of the user terminal, using a secret key stored in the secure element, the secret key being obtained by diversification of a master key using a unique identifier of the user terminal, the encrypted data being stored in the memory of the user terminal, the method comprising, in an access device:

performing mutual authentication with the secure element, the mutual authentication establishing, between the secure element and the access device, a communication channel secured by a session key;

sending, to the secure element, a request to access the data stored in the user terminal and encrypted by the operating system of the user terminal using the secret key stored in the secure element; and     in response to the request, receiving, from the secure element via the secure communication channel, the data having been decrypted and then encrypted by the session key.

16. An access device for accessing a user terminal integrating a secure element and including a memory storing data encrypted, by an operating system of the user terminal, using a secret key stored in the secure element, the secret key being obtained by diversification of a master key using a unique identifier of the user terminal, the secure element being a chip or a smart card integrated in the user terminal, the secure element including a specific microprocessor and one or more memories, the user terminal and the secure element communicating with each other using a secure element reader, the access device comprising a microprocessor configured to:

perform mutual authentication with the secure element, the mutual authentication establishing, between the secure element and the access device, a communication channel secured by a session key;

send, to the secure element, a request to access the data that are stored in the user terminal and encrypted by the operating system of the user terminal using the secret key stored in the secure element; and     in response to the request, receive, from the secure element via the secure communication channel, the data having been decrypted and then encrypted by the session key.

\* \* \* \* \*